(12) United States Patent
Salmon et al.

(10) Patent No.: US 9,244,995 B2
(45) Date of Patent: *Jan. 26, 2016

(54) METHOD AND SYSTEM FOR SYNCHRONIZING A SERVER AND AN ON-DEMAND DATABASE SERVICE

(71) Applicant: salesforce.com, inc., San Francisco, CA (US)

(72) Inventors: Greg Salmon, Walnut Creek, CA (US); Chris Hopkins, San Mateo, CA (US); Anant Verma, Fremont, CA (US); Jesse Collins, San Francisco, CA (US); Craig Weissman, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/275,777

(22) Filed: May 12, 2014

(65) Prior Publication Data

US 2014/0250065 A1 Sep. 4, 2014

Related U.S. Application Data

(63) Continuation of application No. 13/475,893, filed on May 18, 2012, now Pat. No. 8,762,329, which is a continuation of application No. 12/883,082, filed on Sep. 15, 2010, now Pat. No. 8,204,855, which is a continuation of application No. 11/848,993, filed on Aug. 31, 2007, now Pat. No. 7,827,138.

(60) Provisional application No. 60/827,874, filed on Oct. 2, 2006.

(51) Int. Cl.
*G06F 17/30* (2006.01)

(52) U.S. Cl.
CPC .... *G06F 17/30575* (2013.01); *G06F 17/30174* (2013.01)

(58) Field of Classification Search
CPC ................... G06F 17/30575; G06F 17/30174; G06F 17/30144; G06F 17/30082; G06F 17/30194
USPC .................................. 707/610, 612, 620, 623
See application file for complete search history.

(56) References Cited

U.S. PATENT DOCUMENTS

| | | | |
|---|---|---|---|
| 5,577,188 A | 11/1996 | Zhu et al. | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,085,235 A * | 7/2000 | Clarke, Jr. ........... | H04L 12/1886 709/217 |

(Continued)

*Primary Examiner* — Thanh-Ha Dang
(74) *Attorney, Agent, or Firm* — Zilka-Kotab, PC (57) ABSTRACT

In accordance with embodiments, there are provided mechanisms and methods for synchronizing a server and an on-demand database service. These mechanisms and methods for synchronizing a server and an on-demand database service can enable embodiments to synchronize a larger amount of data. The ability of embodiments to provide such feature can enable more effective synchronization of a user-level sharing entity database with a multi-user on-demand database service.

9 Claims, 8 Drawing Sheets

(56) References Cited

U.S. PATENT DOCUMENTS

| | | |
|---|---|---|
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,421,457 B2 * | 9/2008 | Brodersen et al. |
| 7,448,040 B2 * | 11/2008 | Ellis et al. ............ 719/310 |
| 7,454,668 B1 * | 11/2008 | Yochai ............ G06F 11/1435 714/52 |
| 7,508,789 B2 | 3/2009 | Chan |
| 7,620,655 B2 | 11/2009 | Larsson et al. |
| 7,698,160 B2 | 4/2010 | Beaven et al. |
| 7,779,039 B2 | 8/2010 | Weissman et al. |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,457,545 B2 | 6/2013 | Chan |
| 8,484,111 B2 | 7/2013 | Frankland et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0047387 A1 * | 3/2003 | Bogat ............ A47F 9/047 186/59 |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0223022 A1 | 10/2005 | Weissman |
| 2006/0021019 A1 | 1/2006 | Hinton et al. |
| 2007/0078950 A1 * | 4/2007 | Hopkins ............ G06F 17/30861 709/217 |
| 2007/0130137 A1 * | 6/2007 | Oliver ............ G06F 17/30286 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |

\* cited by examiner

METHOD AND SYSTEM FOR SYNCHRONIZING A SERVER AND AN ON-DEMAND DATABASE SERVICE

CLAIM OF PRIORITY

This application is a continuation of U.S. application Ser. No. 13/475,893, filed May 18, 2012, which is a continuation of U.S. application Ser. No. 12/883,082, filed Sep. 15, 2010, which is a continuation of U.S. application Ser. No. 11/848, 993, filed Aug. 31, 2007, which claims the benefit of U.S. Provisional Patent Application No. 60/827,874, filed Oct. 2, 2006, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to synchronizing data in a database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

It is often necessary to synchronize data in such database systems. As the amount of data stored by a database system increases, so does the amount of processing, bandwidth, etc. that is required for synchronizing the same between different databases. There is thus a need for addressing these and/or other issues.

BRIEF SUMMARY

In accordance with embodiments, there are provided mechanisms and methods for synchronizing a server and an on-demand database service. These mechanisms and methods for synchronizing a server and an on-demand database service can enable embodiments to synchronize a larger amount of data. The ability of embodiments to provide such feature can enable more effective synchronization of a user-level sharing entity database with a multi-user on-demand database service.

In an embodiment and by way of example, a method for synchronizing a server and an on-demand database service is provided. The method embodiment includes determining a difference between data stored on a first server and by an on-demand database service, utilizing a data structure stored on a computer readable medium. Such data structure includes a plurality of user identifiers each identifying one of a plurality of users of the on-demand database service. The data structure further includes a plurality of data identifiers that are each correlated with at least one of the user identifiers. Such data identifiers are adapted for identifying data accessible to the user associated with the correlated user identifier. In use, the first server and the on-demand database service may thus be synchronized, based on the aforementioned difference.

While the present invention is described with reference to an embodiment in which techniques for synchronizing a server and an on-demand database service are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

General Overview

Systems and methods are provided for synchronizing a server and an on-demand database service.

Any attempt to synchronize a user-level sharing entity server and a multi-user on-demand database service poses various challenges. For example, if the user-level sharing entity server is permitted to directly query the multi-user on-demand database service in an unfettered manner, it is possible that such multi-user on-demand database service may be overrun with queries, etc. These mechanisms and methods for synchronizing a server and anon-demand database service can enable embodiments to synchronize a larger amount of data. As will soon become apparent, this may be accomplished utilizing a particular data structure that enables different users to be correlated with specific data.

To this end, a subset of data may be synchronized, without necessarily requiring synchronization of a larger set of data (which would require excessive resources). The ability of embodiments to provide such feature can enable more effective synchronization of a user-level sharing entity server with a multi-user on-demand database service. Next, mechanisms and methods for providing synchronizing a server and an on-demand database service will be described with reference to example embodiments.

Figure 1:
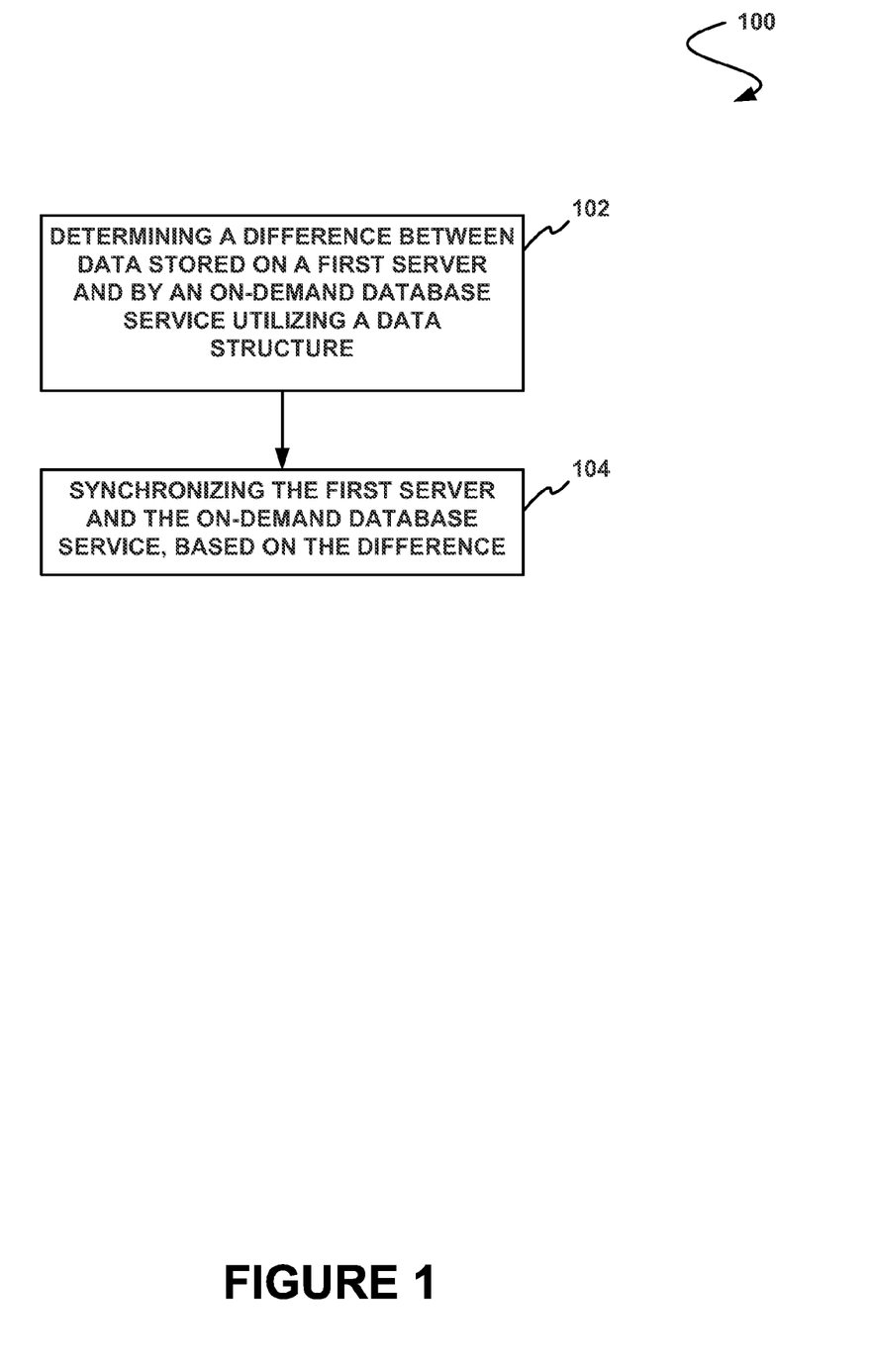
FIG. 1 illustrates a method for synchronizing a server and an on-demand database service, in accordance with one embodiment.

FIG. 1 illustrates a method 100 for synchronizing a server and an on-demand database service, in accordance with one embodiment. In one embodiment, the aforementioned on-demand database service may include a multi-tenant database system. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

As shown in operation 102, a difference is determined between data stored on a first server and by an on-demand database service, in the context of the present description, the server may include any computer and/or device that is coupled to the on-demand database service via a network. In one possible embodiment, the server may include a user-level sharing entity in the form of one or more mail servers. Such mail servers may store various information including, but not limited to contact information, mail, calendar information, and/or any other data, for that matter. One exemplary mail server may include the MICROSOFT® EXCHANGE® server.

Further, the aforementioned difference may be determined in any desired manner. For example, a simple comparison may be performed to identify any disparity, etc. Further, more sophisticated techniques (e.g. hashing, indexing, etc.) may be used for reducing the processing required to determine the difference, etc.

In one embodiment, the difference may be determined utilizing a data structure stored on a computer readable medium. In various embodiments, the computer readable medium may or may not be a component of the aforementioned server, on-demand database service, and/or a separate server, etc. In any case, the data structure includes a plurality of user identifiers each identifying one of a plurality of users of the on-demand database service and a plurality of data identifiers each correlated with at least one of the user identifiers. Such data identifiers are adapted for identifying data accessible to the user associated with the correlated user identifier. Additional details associated with an exemplary data structure will be set forth hereinafter during the description of a different embodiment illustrated in FIG. 2.

In use, the first server and the on-demand database service are synchronized, based on the difference. See operation 104. By using the foregoing data structure to determine which data is visible to which user, the method 100 may afford a more effective way of synchronizing the first server and the on-demand database service. For example, instead of permitting a user-level sharing entity server to directly query a multi-user on-demand database service in an unfettered manner, an intermediate system may use the aforementioned data structure to manage the synchronization between the user-level sharing entity server and the multi-user on-demand database service.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
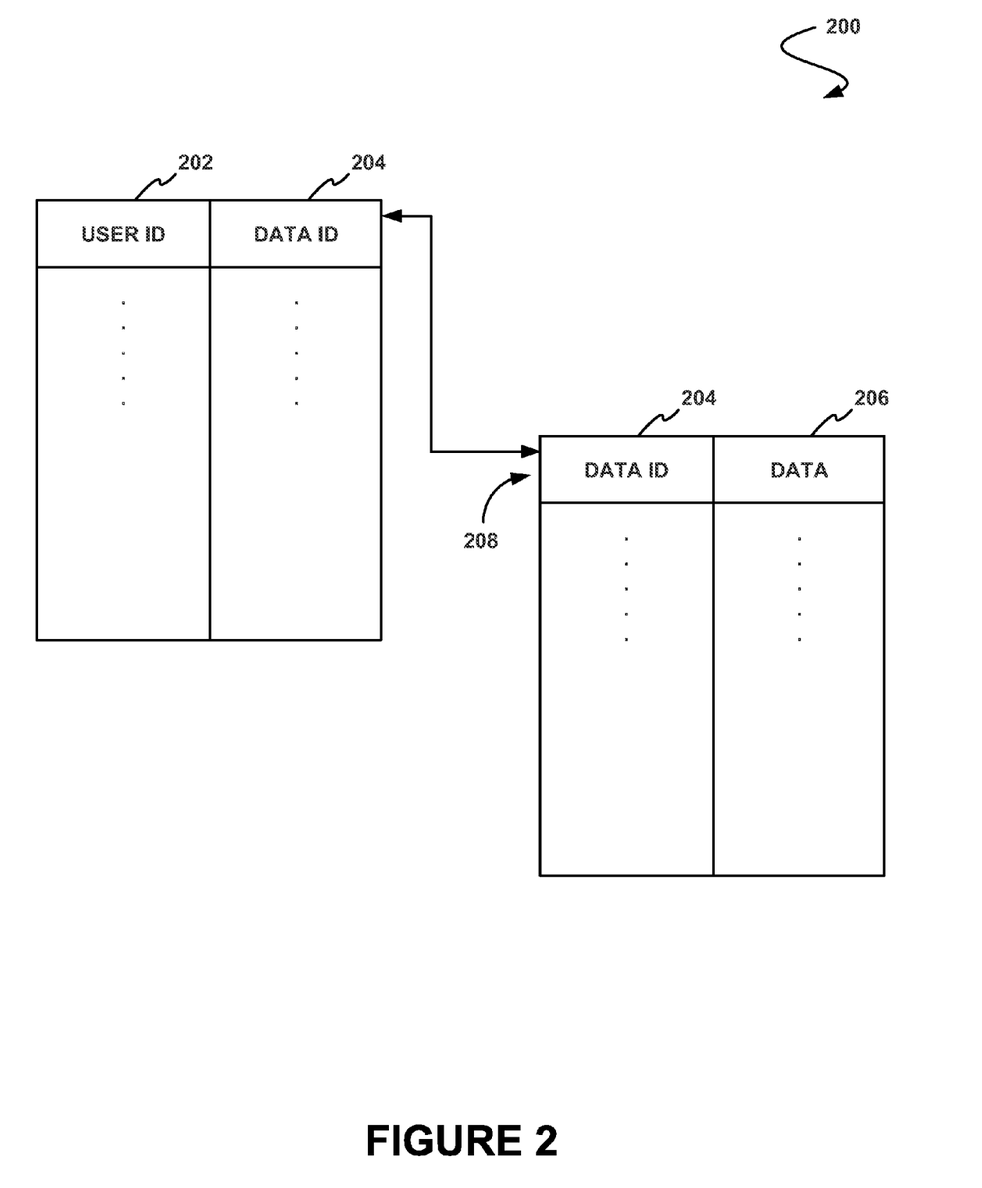
FIG. 2 shows a data structure for synchronizing a server and an on-demand database service, in accordance with one embodiment.

FIG. 2 shows a data structure 200 for synchronizing a server and an on-demand database service, in accordance with one embodiment. As an option, the present data structure 200 may be used to carry out the method 100 of FIG. 1, for example. Of course, however, the data structure 200 may be used in any desired environment. It should also be noted that the aforementioned definitions may apply during the present description.

As shown, the data structure 200 includes a plurality of user identifiers 202 each identifying one of a plurality of users of an on-demand database service. Further included is a plurality of data identifiers 204 each correlated with at least one of the user identifiers 202. Such data identifiers 204 are adapted for identifying data accessible to the user associated with the correlated user identifier. Specifically, the data identifiers 204 may each point to another data structure 206 that correlates the data identifiers 204 with data entries 208 including the aforementioned corresponding data, as shown.

In one embodiment, the data structures 200, 206 may each include a table. Of course, the data structures 200, 206 may take other forms in the context of different embodiments. In any case, the data structures 200, 206 are used in conjunction for accessing the data using the user identifiers. While two data structures 200, 206 are shown, it should be noted that additional data structures (not shown) may be used to point to further organized data, etc.

By correlating the user identifiers 202 and the data identifiers 204 in the foregoing manner, the data structure 200 is capable of being used to control access to the data on a user-by-user basis. In particular, by associating users with corresponding data which is accessible to such user, data may be more effectively accessed and operated upon for each user (or group of users).

For example, if a group of users is defined by users_1-100 (out of 10K users in a multi-tenant system) and synchronization of data accessible to the group is desired, the data structure 200 may be used to effectively identify the data to be subjected to the synchronization. Specifically, the user identifiers 202 associated with users_1-100 may be used to conveniently identify the corresponding data identifiers 204 and data entries 208.

Figure 3:
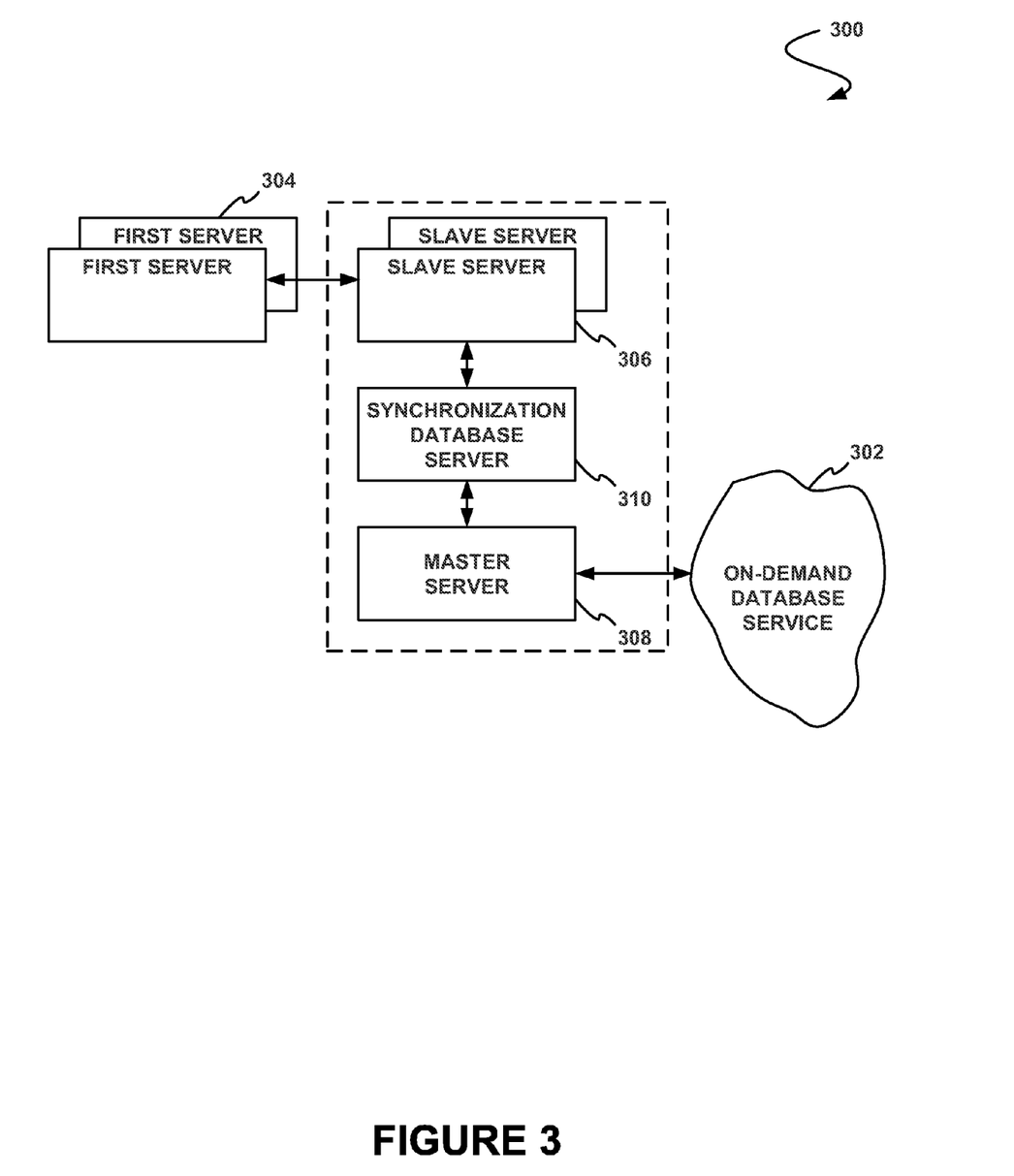
FIG. 3 shows a system for synchronizing a server and an on-demand database service, in accordance with another embodiment.

FIG. 3 illustrates a system 300 for synchronizing a server and an on-demand database service, in accordance with another embodiment. As an option, the present system 300 may be used to implement the method 100 of FIG. 1 using the data structure 200 of FIG. 2, for example. Of course, however, the system 300 may be used in any desired environment. Again, the aforementioned definitions may apply during the present description.

As shown, an on-demand database service 302 remains in data communication with one or more first servers 304 via a plurality of intermediate components. Such components include a plurality of slave servers 306 that are each in data communication with the first servers 304. In one embodiment, each of the slave servers 306 is allocated to a different subset of the users of the first servers 304. Further, the first servers 304 and the slave servers 306 may communicate utilizing a collaborative authoring protocol. One exemplary collaborative authoring protocol may include the World Wide Web distributed authoring and versioning (WebDAV) protocol.

Further included is a master server 308 that is in data communication with the on-demand database service 302. In one embodiment, the master server 308 may communicate with the on-demand database service 302 via a web service. As a further option, the master server 308 may be equipped with the ability to disable any one or more of the slave servers 306.

Also provided is a database server 310 that is coupled between the slave servers 306 and the master server 308 for allowing data communication therebetween. In one embodiment, the database server 310 may include a computer readable medium with a data structure stored thereon that may be used for synchronizing data stored on the one or more first servers 304 and by the on-demand database service 302. As an option, such data structure may include the data structure 200 of FIG. 2, for example. Of course, other embodiments are contemplated where such data structure is stored in other locations.

In use, the first servers 304 may communicate data to be synchronized to the appropriately allocated slave servers 306. Such data may be stored on the first servers 304 and be the subject of various modifications (e.g. addition, changes, deletions, etc.) performed by the users of the first servers 304. Similarly, the on-demand database service 302 may communicate data to be synchronized to the master server 308. Again, such data may be stored by the on-demand database service 302 and be the subject of various modifications (e.g. addition, changes, deletions, etc.) performed by the users of the on-demand database service 302.

Given such data, the slave servers 306 and the master server 308 store the same on the database server 310 for the purpose of identifying a difference between the data, utilizing the aforementioned data structure. For example, a subset of the data that is visible to particular users of interest may be identified, using the data structure. To this end, the aforementioned difference may be determined with respect to the appropriate data.

Once such difference is identified, the first servers 304 and the on-demand database service 302 may be synchronized, as appropriate. By buffering the on-demand database service 302 with the master server 308, a scaleable number of slave servers 306, etc., the system 300 may prevent the on-demand database service 302 from being overrun by the first servers 304, in one embodiment. More information will now be set forth regarding exemplary functionality of the foregoing components in the context of different embodiments illustrated in subsequent figures.

Figure 4:
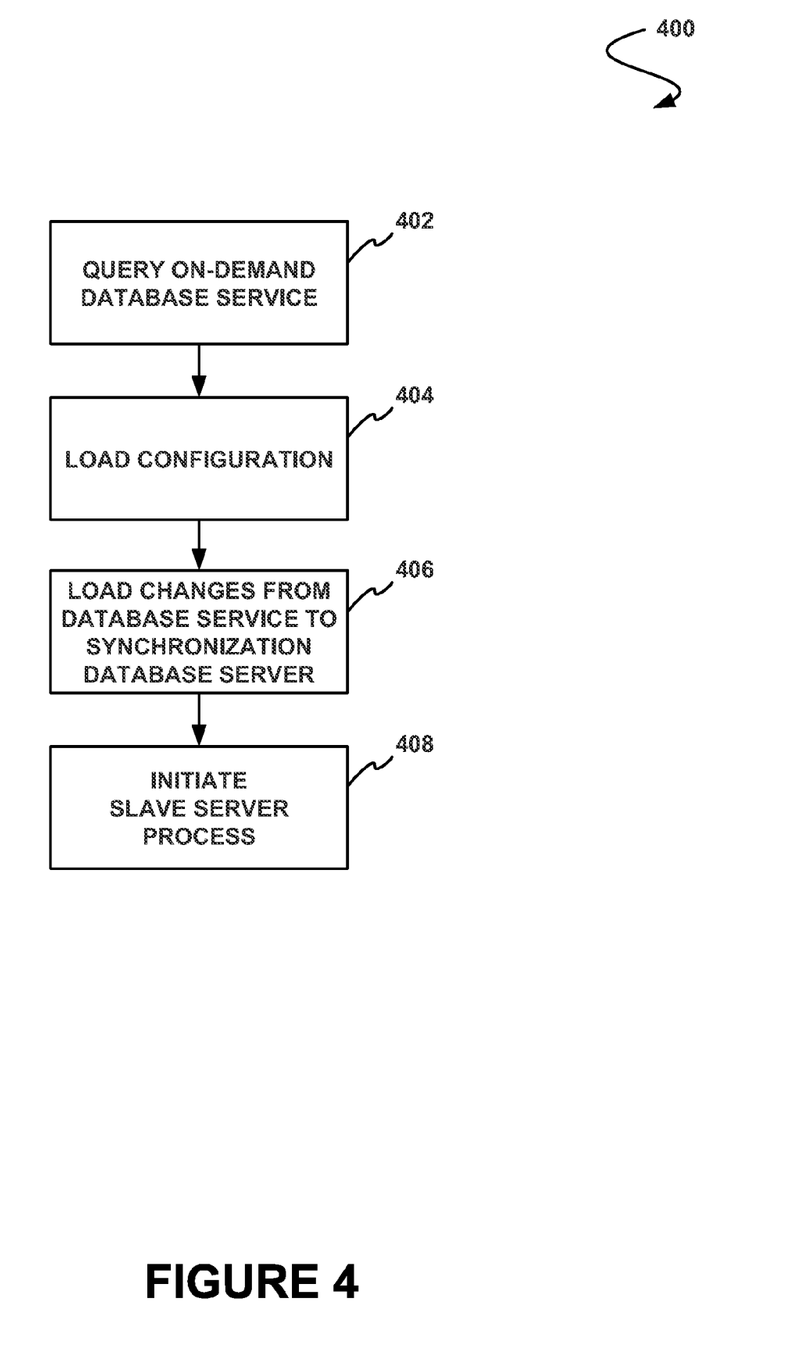
FIG. 4 illustrates a method for initiating the synchronization of a server and an on-demand database service, in accordance with another embodiment.

FIG. 4 illustrates a method 400 for initiating the synchronization of a server and an on-demand database service, in accordance with another embodiment. As an option, the present method 400 may be used carried out in the context of the architecture and/or functionality of FIGS. 1-3. For example, the method 400 may represent functionality of a master server (e.g. the master server 308 of FIG. 3). Of course, however, the method 400 may be carried out in any desired environment. Again, the aforementioned definitions may apply during the present description.

As shown, an on-demand database service (e.g. the on-demand database service 302 of FIG. 3) may be queried. See operation 402. Such query may be initiated in response to the receipt of a request to update the data of one or more users of the on-demand database service, for synchronization purposes.

In response to such query, configuration data is sent from the on-demand database service to a master server (e.g. the master server 308). Note operation 404. Such configuration data may be stored by the on-demand database service and include various policies, rules, etc. that govern a desired synchronization process.

In one embodiment, such configuration data may be user configurable and thus be different on a user-to-user basis. Just by way of example, the configuration data may indicate which users are to be subjected to a synchronization, user-specific synchronization profiles for each user, field maps indicating which fields on the on-demand database service are to be mapped to which fields on another server (e.g. the first server(s) 304), etc. To this end, the master server may use the configuration data to configure the synchronization process to follow.

Next, any data changes (indicated by the configuration data) are loaded from the on-demand database service to a synchronization database server (e.g. the database server 310). See operation 406. In one embodiment, this may be accomplished by copying a plurality of data tables from the on-demand database service to the master server which, in turn, communicates the same to the synchronization database server. As an option, the present operation 406 may be repeated periodically and/or on-demand, so that the synchronization database server has up-to-date data changes from the on-demand database service.

Finally, a slave server process is initiated, as indicated in operation 408. Such slave server process may work to prepare one or more slave servers (e.g. the slave server 306) for interfacing with one or more servers to be synchronized with the on-demand database service.

Figure 5:
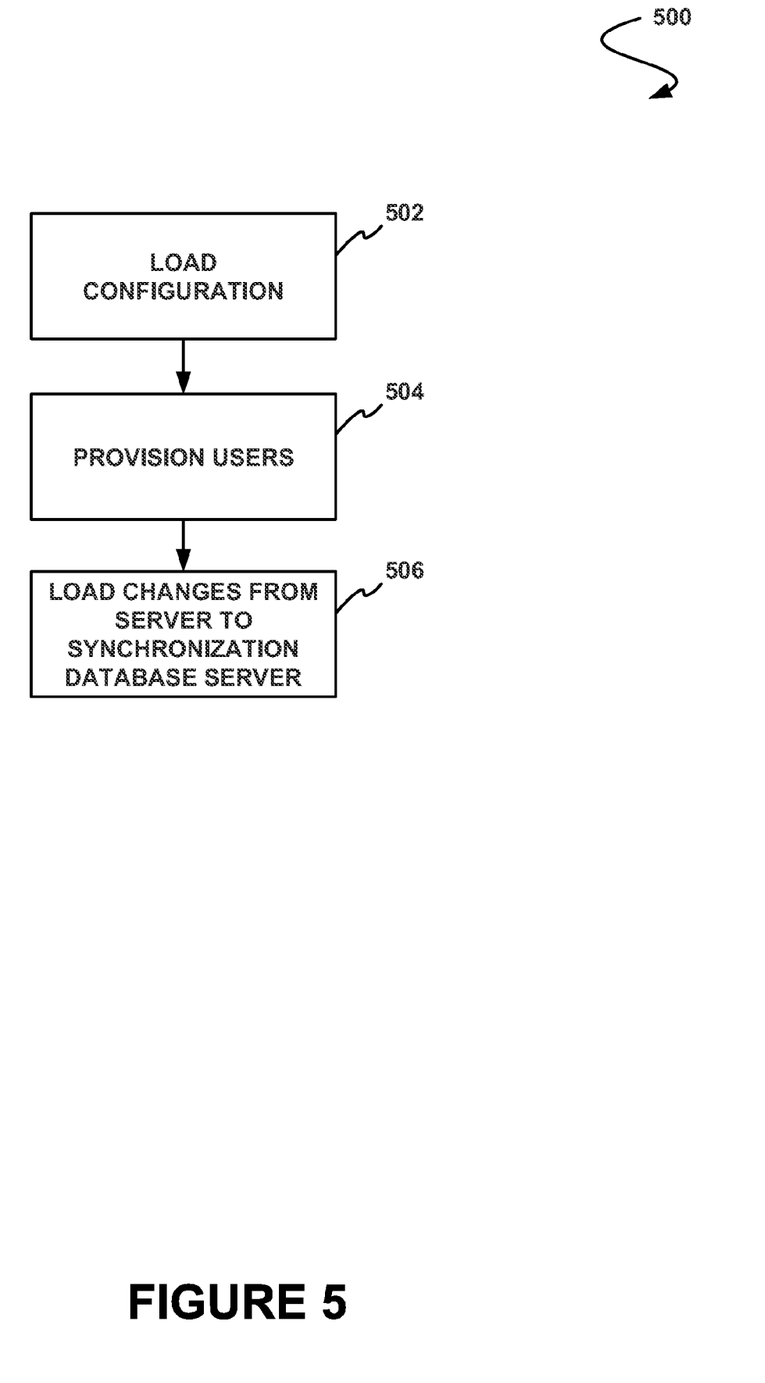
FIG. 5 illustrates a method for preparing a slave server for a synchronization process, in accordance with another embodiment.

FIG. 5 illustrates a method 500 for preparing a slave server for a synchronization process, in accordance with another embodiment. As an option, the present method 500 may be used carried out in the context of the architecture and/or functionality of FIGS. 1-4. For example, the method 500 may represent functionality of a slave server (e.g. one or more of the slave servers 306 of FIG. 3). Of course, however, the method 500 may be carried out in any desired environment. Again, the aforementioned definitions may apply during the present description.

As shown, configuration data is loaded on a slave server (e.g. one or more of the slave servers 306 of FIG. 3). Note operation 502. In one embodiment, such configuration data may be stored at an on-demand database service (e.g., the on-demand database service 302) and may include the same or similar configuration data mentioned above in operation 404 of FIG. 4. To this end, similar to the configuration of the master server, each slave server may configure itself in accordance with the configuration data.

Next, in operation 504, the users may be provisioned across each of the slave servers. In one embodiment, this may be carried out in accordance with the aforementioned allocation. To this end, each slave server may be responsible for only synchronizing data changes associated with the associated group of users.

Thus, each of the slave servers may be allocated to a different subset of the users. Table 1 illustrates an exemplary allocation. Of course, such allocation is set forth for illustrative purposes only and should not be construed as limiting in any manner whatsoever.

TABLE 1

| Slave_server_1 | Users_1-150 |
| Slave_server_2 | Users_151-350 |
| Slave_server_3 | Users_351-400 |
| Slave_server_4 | Users_401-750 |

With such provisioning in place, each of the slave servers may load the changes to data corresponding with the specific allocated users into a synchronization database server (e.g. the database server 310). Note operation 506.

In one embodiment, this may be accomplished by reviewing each of a plurality of records that require synchronization. For example, it may first be determined whether the record was the subject of a change, update, deletion, or was just created. Based on such determination, the data change may be temporarily stored in a separate pending table (e.g. a change table, an update table, a deletion table, a creation table, etc.).

If a particular record was the subject of a change, a process may be performed to identify any duplication of such record in the database server. For example, if a master server (e.g. in the method 500 of FIG. 5) copied such record from the on-demand database service due to a change made by such service, such record may be deemed to be duplicative. In such case, the changes to the record may be merged into a single record.

If, on the other hand, the record from the first server(s) was the subject of an update, deletion, etc., an entry may be stored in the database server in an associated update table, deletion table, etc., for reasons that will soon become apparent. In any case, the present operation 506 may be repeated periodically and/or on-demand, so that the synchronization database server has up-to-date data changes from the first server(s).

Figure 6:
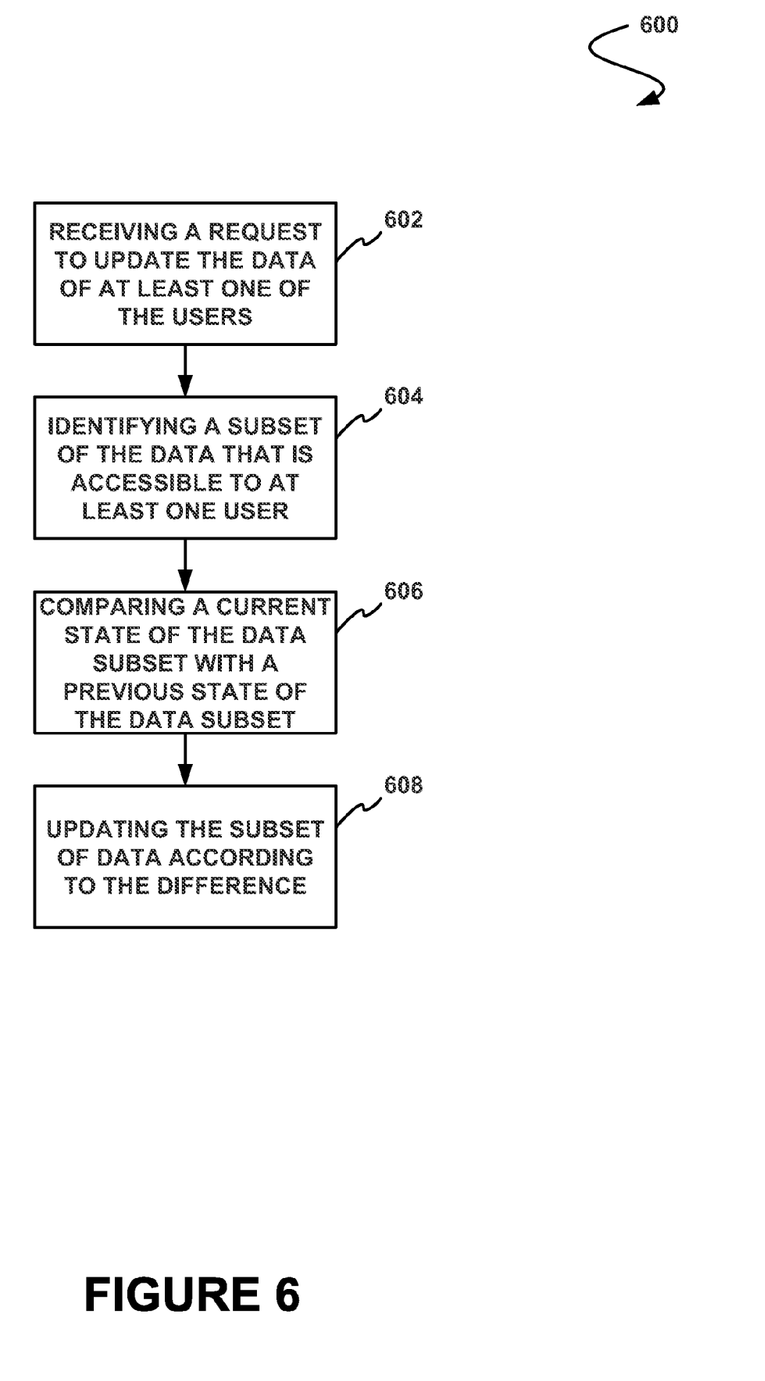
FIG. 6 illustrates a method for synchronizing an on-demand database service, in accordance with another embodiment.

FIG. 6 illustrates a method 600 for synchronizing an on-demand database service, in accordance with another embodiment. As an option, the present method 600 may be used carried out in the context of the architecture and/or functionality of FIGS. 1-5. For example, the method 600 may represent functionality of a synchronization database server (e.g. the database server 310 of FIG. 3). Of course, however, the method 600 may be carried out in any desired environment. Again, the aforementioned definitions may apply during the present description.

During operation of the method 600, it may be assumed that a database server (e.g. the database server 310) is supplied with up-to-date data changes made at a first server (e.g. the first server(s) 304) as well as any data changes made at an on-demand database service (e.g. the on-demand database service 302). This may, for example, be accomplished utilizing master/slave servers, as indicated in FIGS. 4-5.

As shown, in operation 602, a request is received to update data of at least one of a plurality of users, for synchronization purposes. It should be noted that such update request may be for an update of the on-demand database service. Next, a subset of the data that is accessible to the at least one user is identified, utilizing a data structure. See operation 604.

In one embodiment, such data structure may include the data structure 200 of FIG. 2. For example, the users associated with the update request may first be identified, and then corresponding user identifiers (e.g. user identifiers 202, etc.) may be used to identify the corresponding data subset (e.g. using data identifiers 204, etc.). By this design, an update may be limited to the appropriate portion of the data stored by the associated database system.

Next, a current state of the data subset is compared with a previous state of the data subset. See operation 606. To this end, a difference may thus be identified. Such comparison may be performed in any desired manner. For example, the appropriate portion of data (relevant to the proper users) may be identified utilizing the pending tables (e.g. change table, deletion table, etc.) loaded in operation 506. Further, once any changes to the appropriate subset of data are identified, the relevant fields may be updated in the on-demand database service.

To this end, the subset of the data may be updated according to the difference. Note operation 608. It should be noted that this may be accomplished in any desired manner. For example, in one embodiment, the method 600 may rely on a mapping table which maps fields of the first server(s) with those of the on-demand database service. To this end, any identified changes made to certain fields in the first server(s) may be propagated to the corresponding mapped fields of the on-demand database service. As an option, such propagation may be throttled (e.g. using the master server and any associated configuration data, etc.) to prevent the on-demand database service from being overrun.

System Overview

Figure 7:
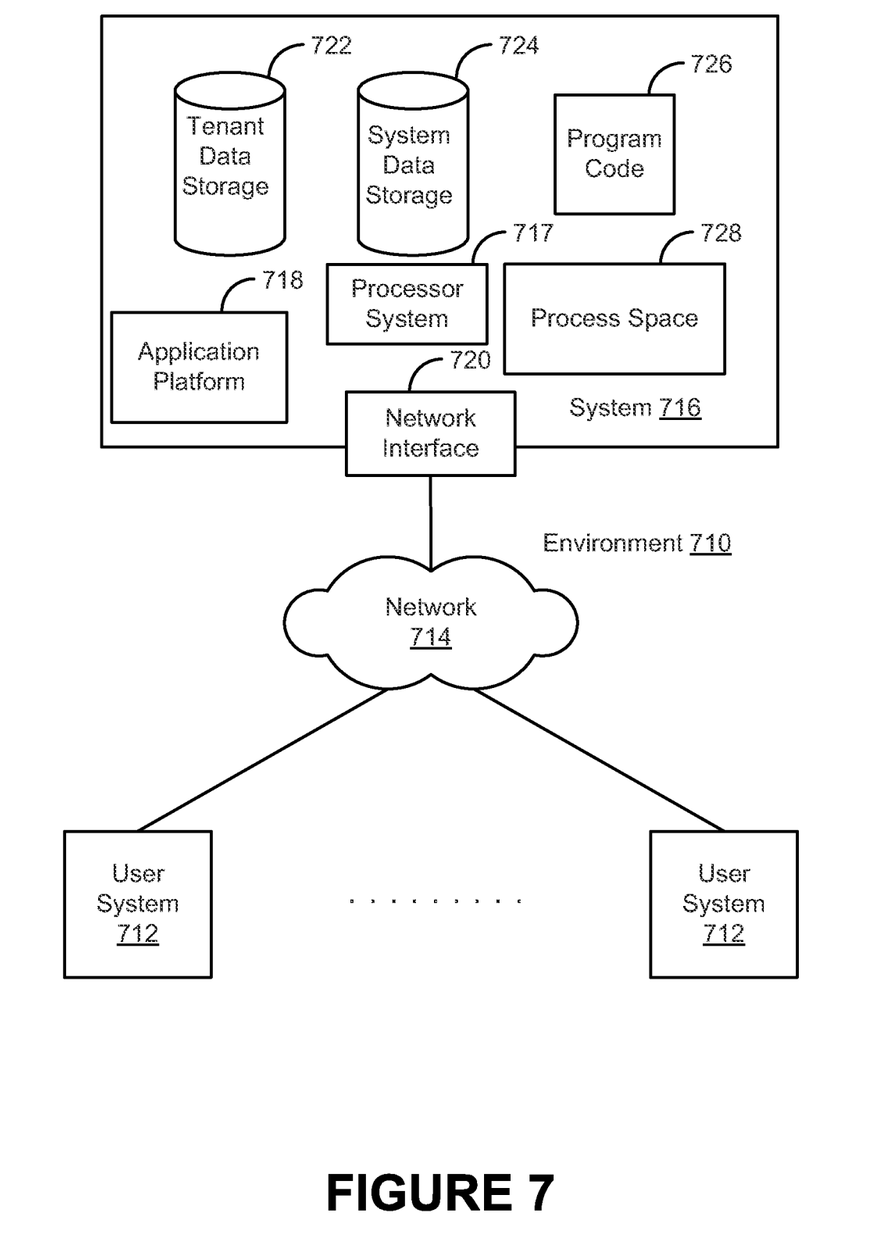
FIG. 7 illustrates a block diagram of an example of an environment wherein an on-demand database service might be used.

FIG. 7 illustrates a block diagram of an environment 710 wherein an on-demand database service might be used. As an option, any of the previously described embodiments of the foregoing figures may or may not be implemented in the context of the environment 710.

Environment 710 may include user systems 712, network 714, system 716, processor system 717, application platform 718, network interface 720, tenant data storage 722, system data storage 724, program code 726, and process space 728. In other embodiments, environment 710 may not have all of the components listed and/or may have other elements instead of, or in addition to, those listed above.

Environment 710 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in FIG. 7 (and in more detail in FIG. 8) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" will be used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

Figure 8:
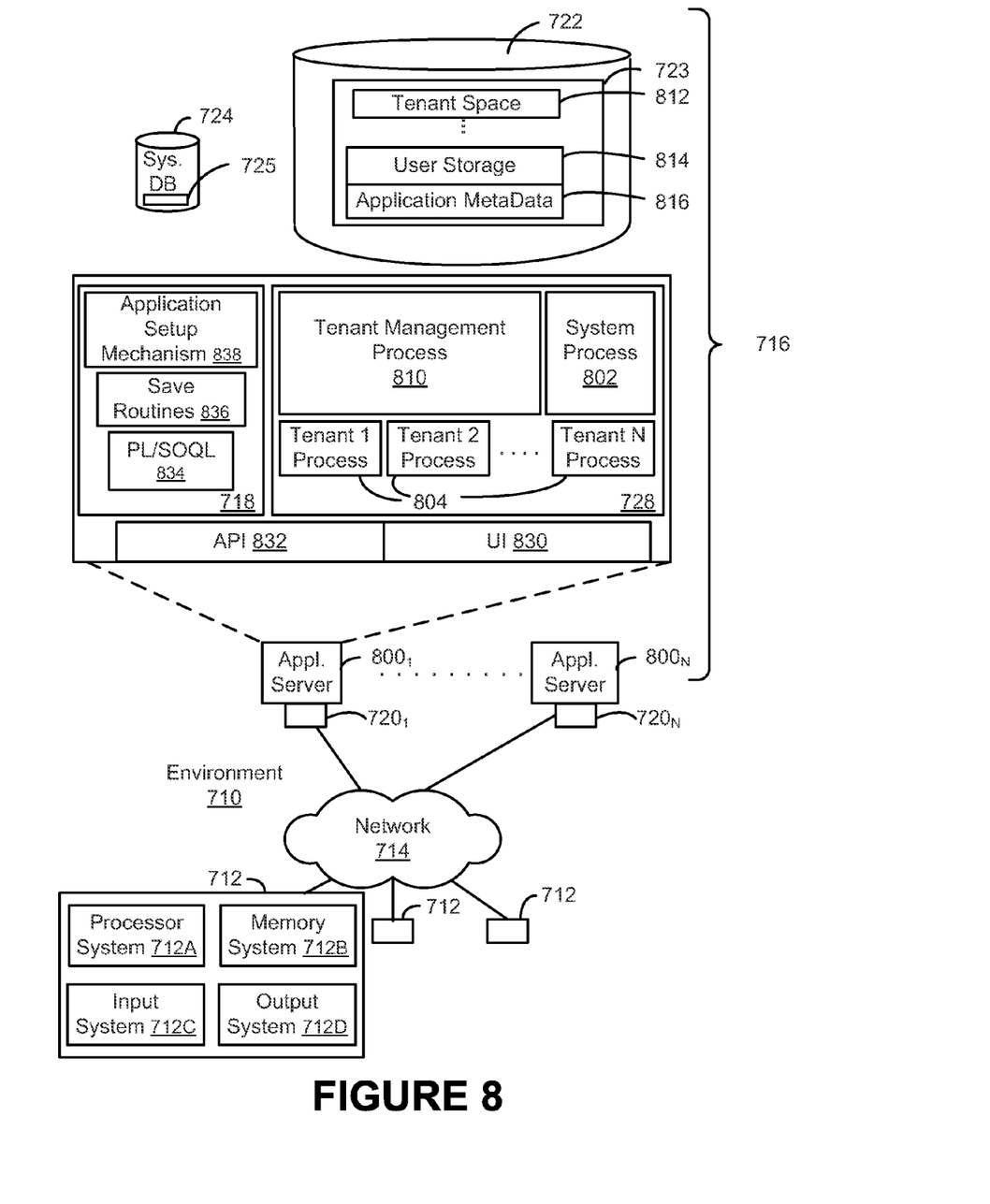
FIG. 8 illustrates a block diagram of an embodiment of elements of FIG. 7 and various possible interconnections between these elements.

One arrangement for elements of system 716 is shown in FIG. 8, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7 include conventional, well-known elements that are explained only briefly here. For example, each user system 712 could include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an NITS, where more than one is present) and all of their components might be operator configurable using application(s) including computer code to run using a central processing unit such as processor system 717, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 716 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 8 also illustrates environment 710. However, in FIG. 8 elements of system 716 and various interconnections in an embodiment are further illustrated. FIG. 8 shows that user system 712 may include processor system 712A, memory system 712B, input system 712C, and output system 712D. FIG. 8 shows network 714 and system 716. FIG. 8 also shows that system 716 may include tenant data storage 722, tenant data 723, system data storage 724, system data 725, User Interface (UI) 830, Application Program Interface (API) 832, PL/SOQL 834, save routines 836, application setup mechanism 838, applications servers $800_1$-$800_N$, system process space 802, tenant process spaces 804, tenant management process space 810, tenant storage area 812, user storage 814, and application metadata 816. In other embodiments, environment 710 may not have the same elements as those listed above and/or may have other elements instead of, or in addition to, those listed above.

User system 712, network 714, system 716, tenant data storage 722, and system data storage 724 were discussed above in FIG. 7. Regarding user system 712, processor system 712A may be any combination of one or more processors. Memory system 712B may be any combination of one or more memory devices, short term, and/or long term memory. Input system 712C may be any combination of input devices, such as one or more keyboards, mice, trackballs, scanners, cameras, and/or interfaces to networks. Output system 712D may be any combination of output devices, such as one or more monitors, printers, and/or interfaces to networks. As shown by FIG. 8, system 716 may include a network interface 720 (of FIG. 7) implemented as a set of HTTP application servers 800, an application platform 718, tenant data storage 722, and system data storage 724. Also shown is system process space 802, including individual tenant process spaces 804 and a tenant management process space 810. Each application server 800 may be configured to tenant data storage 722 and the tenant data 723 therein, and system data storage 724 and the system data 725 therein to serve requests of user systems 712. The tenant data 723 might be divided into individual tenant storage areas 812, which can be either a physical arrangement and/or a logical arrangement of data. Within each tenant storage area 812, user storage 814 and application metadata 816 might be similarly allocated for each user. For example, a copy of a user's most recently used (MRU) items might be stored to user storage 814. Similarly, a copy of MRU items for an entire organization that is a tenant might be stored to tenant storage area 812. A UI 830 provides a user interface and an API 832 provides an application programmer interface to system 716 resident processes to users and/or developers at user systems 712. The tenant data and the system data may be stored in various databases, such as one or more Oracle™ databases.

Application platform 718 includes an application setup mechanism 838 that supports application developers' creation and management of applications, which may be saved as metadata into tenant data storage 722 by save routines 836 for execution by subscribers as one or more tenant process spaces 804 managed by tenant management process 810 for example. Invocations to such applications may be coded using PL/SOQL 34 that provides a programming language style interface extension to API 832. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 816 for the subscriber making the invocation and executing the metadata as an application in a virtual machine.

Each application server 800 may be communicably coupled to database systems, e.g., having access to system data 725 and tenant data 723, via a different network connection. For example, one application server 800$_1$ might be coupled via the network 714 (e.g., the Internet), another application server 800$_{N-1}$ might be coupled via a direct network link, and another application server 800$_N$ might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 Big-IP load balancer) is communicably coupled between the application servers 800 and the user systems 712 to distribute requests to the application servers 800. In one embodiment, the load balancer uses a least connections algorithm to route user requests to the application servers 800. Other examples of load balancing algorithms, such as round robin and observed response time, also can be used. For example, in certain embodiments, three consecutive requests from the same user could hit three different application servers 800, and three requests from different users could hit the same application server 800. In this manner, system 716 is multi-tenant, wherein system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 800 to request and update system-level and tenant-level data from system 716 that may require sending one or more queries to tenant data storage 722 and/or system data storage 724. System 716 (e.g., an application server 800 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method, comprising:
   receiving a request to update data of a user of a system, the data of the user being stored by the system;
   in response to the request, identifying, by the system, data relevant to the user that is stored by a server separate from the system;

utilizing a data structure stored on a non-transitory computer readable storage medium of the system to determine, by the system, a portion of the data stored by the server and identified as relevant to the user that is different from the data of the user that is stored by the system, the data structure including a plurality of user identifiers each identifying one of a plurality of users of the system and a plurality of data identifiers each correlated with at least one of the user identifiers and identifying data accessible to the user associated with the correlated user identifier; and updating, by the system, the data of the user stored by the system with the portion of the data stored by the server and identified as relevant to the user that is determined to be different from the data of the user that is stored by the system.

2. The method of claim 1, wherein the data structure includes a first table.

3. The method of claim 2, wherein a second table includes the data identifiers each correlated with corresponding data.

4. The method of claim 3, wherein the second table is used in conjunction with the first table for accessing the data using the user identifiers.

5. The method of claim 1, wherein the first server includes a user-level sharing entity.

6. The method of claim 1, wherein the system includes a multi-tenant database system.

7. The method of claim 1, wherein the server is a mail server and the identified data stored by the mail server that is relevant to the user includes contact information.

8. A non-transitory machine-readable medium carrying one or more sequences of instructions which, when executed by one or more processors, cause the one or more processors to carry out the steps of:

receiving a request to update data of a user of a system, the data of the user being stored by the system;

in response to the request, identifying, by the system, data relevant to the user that is stored by a server separate from the system;

utilizing a data structure stored on a non-transitory computer readable storage medium of the system to determine, by the system, a portion of the data stored by the server and identified as relevant to the user that is different from the data of the user that is stored by the system, the data structure including a plurality of user identifiers each identifying one of a plurality of users of the system and a plurality of data identifiers each correlated with at least one of the user identifiers and identifying data accessible to the user associated with the correlated user identifier; and updating, by the system, the data of the user stored by the system with the portion of the data stored by the server and identified as relevant to the user that is determined to be different from the data of the user that is stored by the system.

9. An apparatus, comprising:

a processor of a system; and one or more stored sequences of instructions which, when executed by the processor, cause the processor to carry out the steps of:

receiving a request to update data of a user of the system, the data of the user being stored by the system;

in response to the request, identifying, by the system, data relevant to the user that is stored by a server separate from the system;

utilizing a data structure stored on a non-transitory computer readable storage medium of the system to determine, by the system, a portion of the data stored by the server and identified as relevant to the user that is different from the data of the user that is stored by the system, the data structure including a plurality of user identifiers each identifying one of a plurality of users of the system and a plurality of data identifiers each correlated with at least one of the user identifiers and identifying data accessible to the user associated with the correlated user identifier; and updating, by the system, the data of the user stored by the system with the portion of the data stored by the server and identified as relevant to the user that is determined to be different from the data of the user that is stored by the system.

* * * * *